United States Patent [19]

Duga et al.

[11] Patent Number: 4,579,572
[45] Date of Patent: Apr. 1, 1986

[54] METHOD AND APPARATUS FOR ALIGNING A PLUNGER ASSEMBLY IN A GLASS FEEDER

[75] Inventors: Robert J. Duga, Enfield; Robert J. Douglas, N. Granby; Robert L. Doughty, West Hartford; John E. Suomala, Weatogue; Constantine W. Kulig; Kenneth L. Bratton, both of Windsor, all of Conn.

[73] Assignee: Emhart Industries, Inc., Farmington, Conn.

[21] Appl. No.: 722,904

[22] Filed: Apr. 12, 1985

[51] Int. Cl.$^4$ .............................................. C03B 7/08
[52] U.S. Cl. ........................................ 65/29; 65/129; 65/158; 65/167; 65/173
[58] Field of Search ................. 65/126, 129, 158, 172, 65/167, 173, 164, 29

[56] References Cited

U.S. PATENT DOCUMENTS

| | | | |
|---|---|---|---|
| 1,519,885 | 12/1924 | Tucker et al. | 65/126 X |
| 1,934,811 | 11/1933 | Miller | 65/129 |
| 2,073,571 | 3/1937 | Steimer | 65/129 |
| 2,075,756 | 3/1937 | Barker, Jr. | 65/172 |
| 2,950,571 | 8/1960 | Wythe | 65/164 |
| 3,393,989 | 7/1968 | Strausbaugh | 65/126 |
| 4,388,096 | 6/1983 | Boschi | 65/158 X |

Primary Examiner—Arthur Kellogg
Attorney, Agent, or Firm—McCormick, Paulding & Huber

[57] ABSTRACT

One or more jigs or frameworks are provided at a location remote from the glass feeder so several different plunger assemblies can be made up for ready installation in the feeder. Each jig is made up with the help of an alignment tool having characteristics peculiar to that feeder and to the orientation of the plungers relative to the feeder. The extensive downtime now required to repair or replace the refractory plungers in the feeder can be minimized by following the method detailed herein for use of the alignment tool and subsequent fabrication and assembly of the jig or framework in which the plungers are assembled away from the feeder.

4 Claims, 17 Drawing Figures

METHOD AND APPARATUS FOR ALIGNING A PLUNGER ASSEMBLY IN A GLASS FEEDER

This invention relates generally to molten glass feeders of the type having several vertically reciprocable plungers that are adapted to form molten glass gobs at the outlet spout of the feeder. More particularly, this invention relates to a method and apparatus for aligning and orienting a plunger assembly in such a molten glass feeder. The plunger assembly can be made up at a location remote from the feeder itself with the result that downtime of the feeder is greatly reduced when the necessity arises for repair and/or replacement of the plungers.

CROSS REFERENCE TO RELATED APPLICATIONS

This application is related to a pending application entitled "Electronic Glass Feeder Plunger Operating Mechanism" in the names of Robert J. Duga, Constantine W. Kulig, Robert L. Doughty, Robert J. Douglas and Robert P. Anderson, filed June 4, 1984 under Ser. No. 616,638 and assigned to the assignee herein now U.S. Pat. No. 4,551,163.

BACKGROUND OF THE INVENTION

Glass feeders are generally provided on the end of an elongated forehearth channel where molten glass is heated and conveyed to a feeder bowl for the formation of gobs of glass which are then directed to the several molding sections of a glassware forming machine. The bowl itself is generally mounted on fixed structure at the discharge end of the glass forehearth and vertically reciprocable plungers are provided in the feeder bowl to issue glass gobs from orifices defined in an orifice plate supported at the outlet spout of the feeder bowl. A typical installation includes one or more vertically reciprocable plungers operated in timed relationship with shears and other components of the feeder so as to control the manner in which the gobs are formed for gravity feed to the various individual sections of a typical glassware forming machine. Each plunger is generally aligned axially above an associated orifice in the orifice plate provided in the bowl spout, and shears are provided to assure that the successively formed gobs are individually separated from one another so as to be fed to the appropriate molds in the sections of the glassware forming machine. The operation of the forming machine is such that the shears and the feeder are synchronized with the various mechanisms so that all these mechanisms operate cyclically in accordance with a predetermined timing sequence.

Each plunger includes a lower end portion fabricated from a refractory material and an upper portion that includes individual plunger chuck and plunger support structure that is adapted to support each of the plungers in a slot provided for this purpose in a plunger carrier disk. A refractory tube surrounds the plungers inside the feeder bowl and is used to shut down the flow of molten glass to the outlet when the feeder is to be interrupted in its operation, and this refractory tube generally rotates so as to improve the flow of glass between the bottom end of the tube and the feeder bowl outlet spout adjacent to the orifice plate. The tube is also made of a refractory material as is the orifice plate defining the orifices for the plungers. The above-identified pending application is incorporated by reference herein as is a further application entitled "Molten Glass Spout Bowl Refractory Tube Support Mechanism", filed Sept. 27, 1984 in the names of John E. Suomula, Kenneth L. Bratton, Sten E. Bergsten, Nicholas N. Savic, and E. Boyd Gardner also assigned to the assignee herein.

The first above mentioned copending patent application deals with an improved plunger operating mechanism wherein a reversible electric motor is connected to drive a plunger support in a cyclically reciprocating manner, and wherein a programable control means operably coupled to the motor causes such oscillation between predetermined limits and according to a predetermined motion profile. The plunger support bracket is cantilevered so that the reversible motor operates between it and fixed structure associated with the frame provided at the discharge end of the glass forehearth. The plunger support bracket mounting means is capable of being adjustably positioned so that the plungers can be moved in a horizontal plane (in an X and a Y direction) relative to the spout bowl and so that the plungers can be moved vertically relative to the orifices provided for this purpose in the orifice plate itself (the Z direction).

In order to set up the plungers in a feeder of the type described above eye-bolts are provided in the top of each plunger support structure so that the plungers can be lowered into place through enlarged openings provided for this purpose in the plunger carrier disk, which disk is in turn clamped into a receptacle defined for it in a plunger holder defined in the bracket. Each plunger must be manipulated so as to align its lower end with one of the orifices in the orifice plate provided for this purpose in the lower end of the feeder bowl outlet or spout. The process of aligning and orienting the plungers is a time consuming one, and one which can lead to extended downtimes in the feeder itself. Since one feeder serves several machines, each with individual glassware forming machine sections in the typical glassware plant it is advantageous to provide a means for assembling the plunger or plungers in a plunger carrier disk such that the disk can be quickly mounted in the plunger holder after being initially set up in a bench jig or framework so that none of these time consuming adjustments and manipulations lead to feeder downtime as at present required. The present invention seeks to provide a method and apparatus for achieving this purpose.

SUMMARY OF THE INVENTION

The foregoing features of the invention are facilitated in the preferred method and embodiment disclosed herein, which invention as disclosed provides a new and improved method and means best summarized as follows. Prior to installing any plungers or orifice plates in the feeder mechanism itself an alignment disk is provided in the orifice plate support structure at the lower end of the feeder bowl so that this alignment disk is itself located in a predetermined orientation relative to the feeder bowl outlet spout. More particularly, this alignment disk has indexing means provided on it so that the relationship between the line of shear and the longitudinal axis of the forehearth (the shearing angle) is reflected in the orientation for the alignment disk itself. An elongated alignment tool is then provided in the plunger holder so that its upper end is replacing the disk shaped plunger carrier normally provided for supporting the plungers in the normal working feeder configuration. The lower end of this elongated tool is then adjusted vertically by manipulating the conventional controls for the plunger holder mechanism itself so that the tool is centered in an opening provided for this purpose in the alignment disk. The plunger operating mechanism is used to adjust the alignment tool horizontally in the X and Y direction. The alignment tool must also be so rotated in the plunger holder that the lower end of the alignment tool is oriented in a particular relationship to the predetermined orientation dictated by that of the alignment disk. The vertical position of the plunger holder (the Z direction) as well as the angular orientation of the alignment tool are recorded either by means of the electronic readout in the plunger holder operating mechanism or by indexing marks on one or more of the alignment components referred to. The tool is then removed from the plunger holder and the disk from the orifice plate support structure.

A jig framework is provided remote from the feeder for supporting the alignment tool from its upper end so that the tool is suspended in a position analagous to that it had occupied in the feeder bowl. A gage plate is provided in this jig framework so that an opening in the gage plate is adapted to receive the lower end of the alignment tool. The tool is then rotated in the framework so that an indexing device provided in the jig orients the tool in a position corresponding to that of the tool in the plunger holder. By recording the position of the gage plate in the framework, as dictated by the tool orienting step above (by providing half-holes in both the lower end of the tool and in the gage plate) removal of the alignment tool from the jig framework will then permit replacement of the said gage plate with a plunger gage plate in which a pattern of plunger openings is provided in accurately indexed relationship to the gage plate opening. The plunger assembly including the carrier disk are then assembled in the jig framework and each plunger is independently adjusted at a location remote from the feeder so that each plunger is provided at a predetermined vertical dimension relative to the plunger gage plate, and the plungers oriented relative to one another and to the carrier disk so that the entire assembly can be later provided in the feeder with a minimum of downtime being required for the feeder itself. Furthermore, several different configurations of plungers can be preassembled for replacing any other plunger assembly at the end of a particular run in the glassware plant.

DETAILED DESCRIPTION

Figure 1:
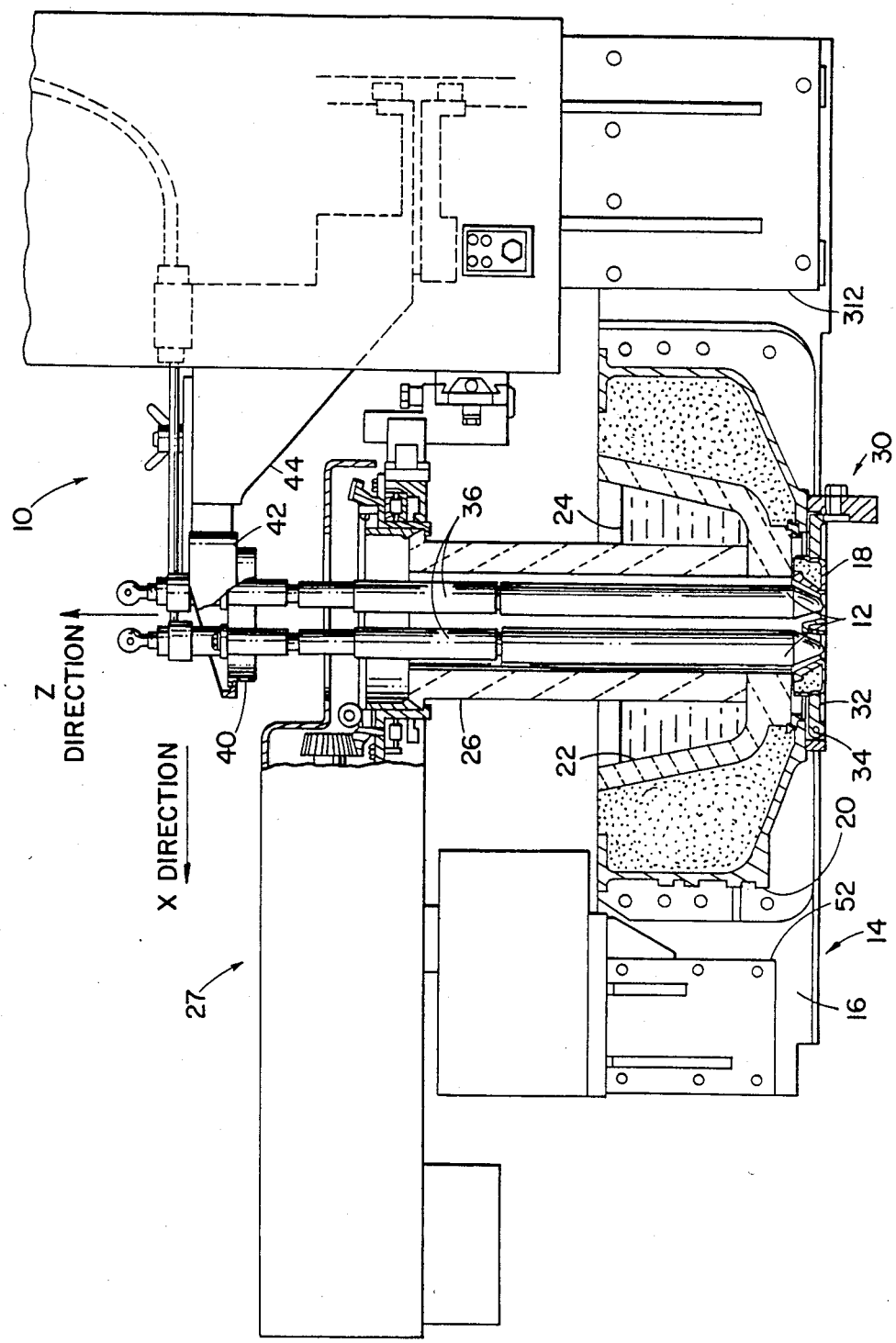
FIG. 1 is a front elevational view partly in cross section showing a typical feeder bowl installation with mechanism for supporting and moving the plungers and also for supporting and rotating the refractory tube, and illustrating the orifice plate and its hinged support structure at the outlet spout of the feeder bowl.

Turning now to the drawings in greater detail, FIG. 1 shows in elevation, partly in vertical section, a plunger operating mechanism indicated generally at 10 constructed in accordance with the disclosure in the above mentioned pending patent application entitled "Electronic Glass Feeder Plunger Operating Mechanism", Ser. No. 616,638, filed June 4, 1984 and incorporated by reference herein. As disclosed therein glass feeder plungers 12, 12 reciprocate vertically relative to orifices defined in an orifice ring 18 so as to form gobs of molten glass for delivery to a glassware machine. The molten glass moves toward the viewer in FIG. 1 from a forehearth furnace 14 into a feeder bowl 22 which is provided with molten glass to the level indicated generally at 24 from the furnace forehearth itself. The forward end 16 of the furnace forehearth supports the feeder bowl 22 and other components of the feeder mechanism to be described.

Figure 6:
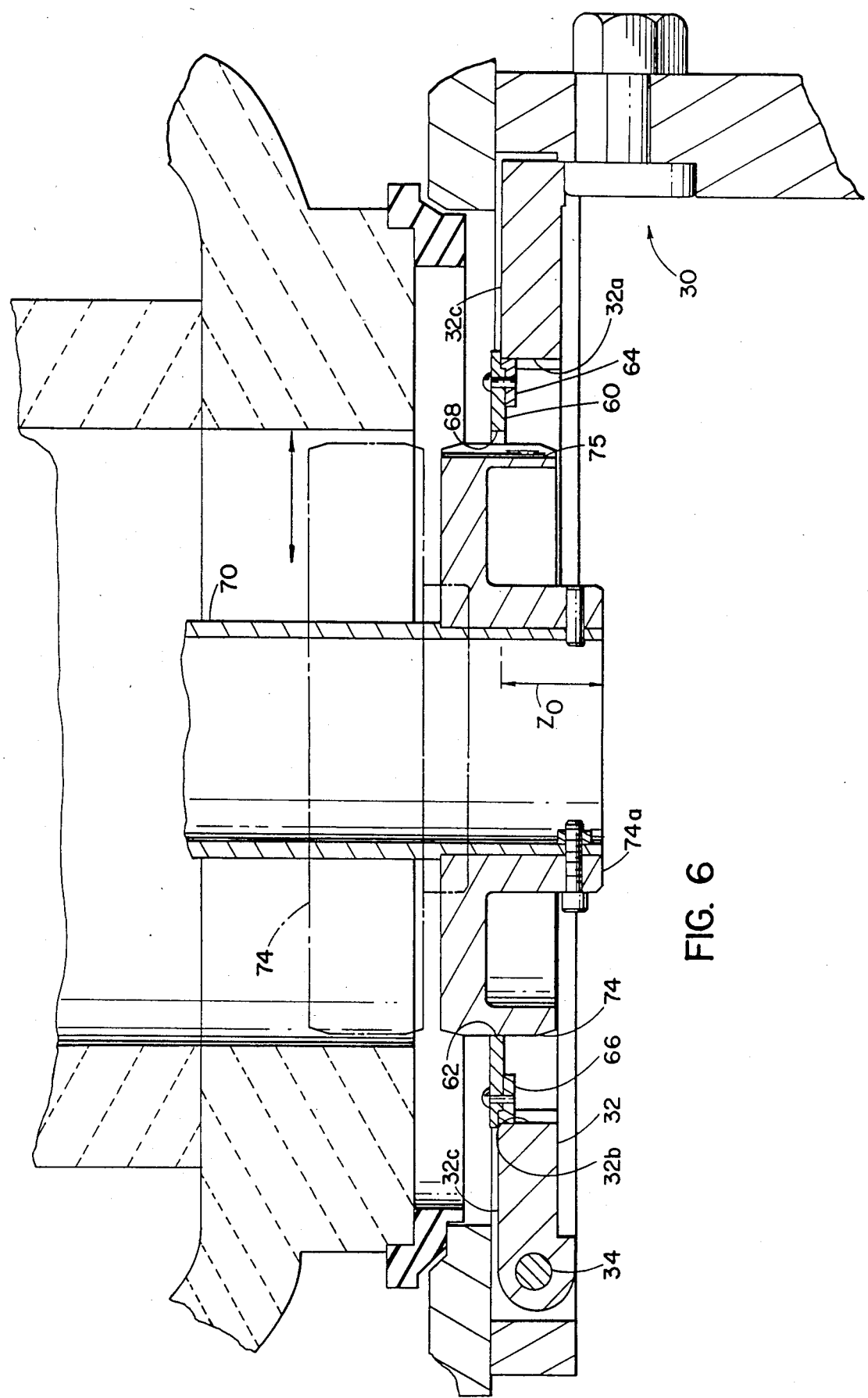
FIG. 6 is a sectional view through the lower outlet spout portion of the feeder bowl with the lower end of the alignment tool provided in an associated opening provided for it in the alignment disk held in the orifice plate support structure.
Figure 7:
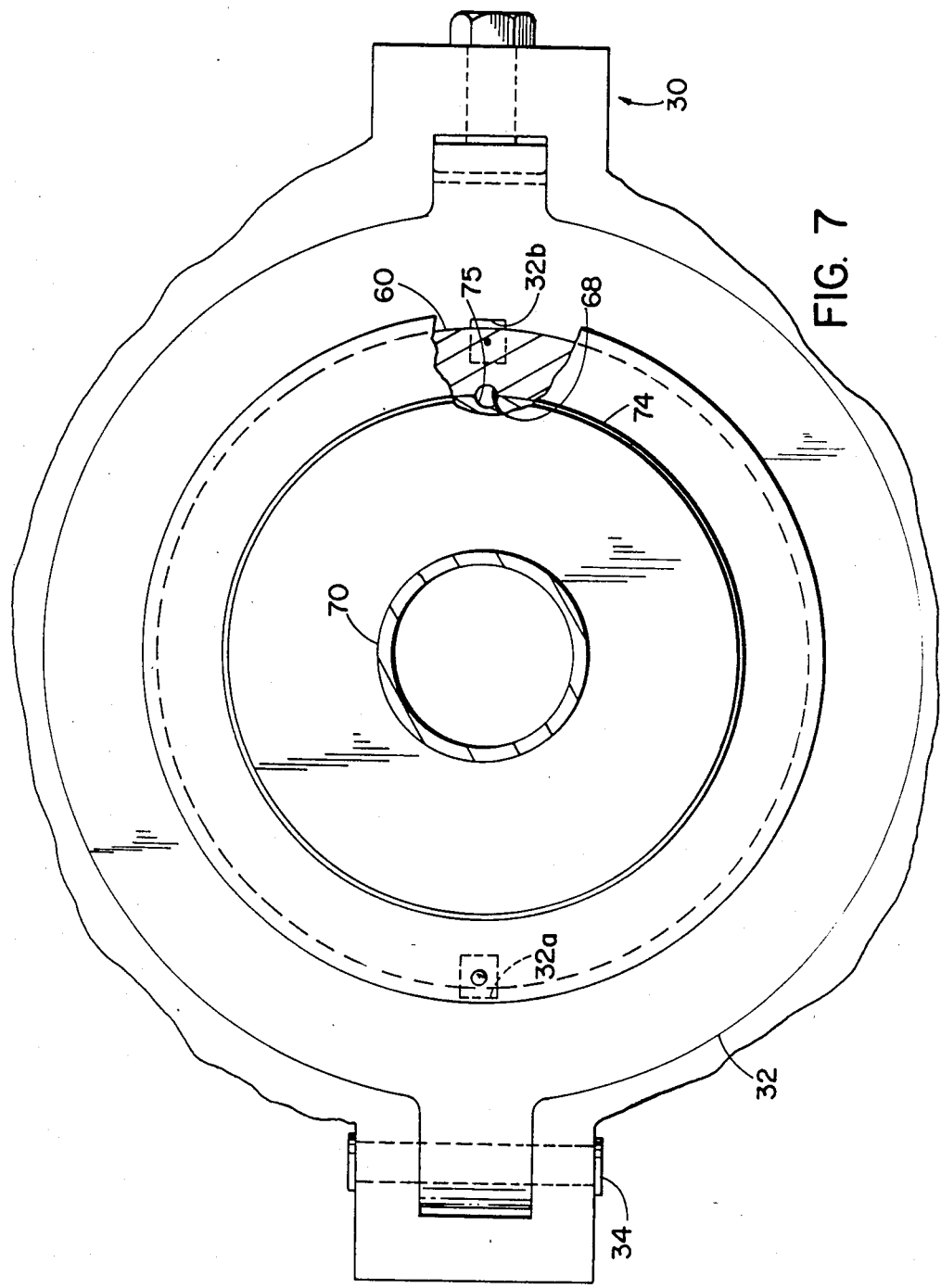
FIG. 7 is a bottom view of the structure illustrated in FIG. 6.

The plunger operating mechanism 10 is mounted by means of bracket 312 to the front end of the furnace forehearth 16 and the feeder bowl 22 is of conventional configuration being provided with a pheripherally extending boss 20 to which may be mounted the shear mechanism (not shown) in accordance with conventional practice. Still with reference to the front end of the furnace forehearth 14 bracket 52 supports a refractory tube operating mechanism 27 described in detail in another copending patent application entitled "Molten Glass Spout Bowl Refractory Tube Support Mechanism", filed Sept. 27, 1984 under Ser. No. 655,502 now U.S. Pat. No. 4,554,000. The refractory tube itself is indicated generally at 26 in FIG. 1 and this tube comprises a refractory material as does the feeder bowl 22 and plungers 12, 12 so that all materials in direct contact with the molten glass are adapted to withstand the temperature of the molten glass itself. The tube 26 normally rotates in the position shown and such that the lower end thereof is spaced slightly above an annular seating surface provided for this purpose inside the feeder bowl 22. In the position shown the refractory tube has been so located that the molten glass will move into the area of the orifices. The spacing between the lower end of the refractory tube 26 and the inside of the feeder bowl determines the flow rate of the molten glass to the orifices defined by the orifice plate 18. The orifice plate itself comprises a refractory orifice defining portion mounted in a superinsulating material and surrounded by a shell-like protective housing. As so configured the orifice plate can be conveniently removed for replacement or repair by releasing the latching mechanism indicated generally at 30 with the result that the orifice plate support structure 32 can be pivoted downwardly from the position shown about the axis of pivot pin 34. FIGS. 6 and 7 illustrate the configuration of the orifice plate support structure and its associated pivot pin 34 and latching mechanism 30 in greater detail and will be referred to hereinafter with reference to other aspects of the present invention.

The plungers 12, 12 are secured in plunger chucks 36, 36, which plunger chucks are in turn mounted in a plunger carrier disk 40. As described in the pending patent application, incorporated by reference herein, carrier disk 40 is attached to a plunger holder, or banjo frame 42 as it is referred to in said pending patent application. The banjo frame or plunger holder 42 is in turned secured to a bracket 44 and actuating means is provided for moving the bracket 44 and hence banjo frame or plunger holder 42. As described in said pending application an electric motor and other components are operatively connected to the bracket 44 and the desired reciprocating motion is achieved through a control system best shown in FIG. 3 of said pending application. The plunger holder or banjo frame 42 is also adapted to be adjusted in the X and Y direction (that is horizontally) so as to position the plungers properly in order to align each plunger 12 with its associated orifice in the orifice plate 18. The procedure for accomplishing this alignment has proven to be quite time consuming in setting up the feeder for different configurations, as between single, double or triple gob for example, and also in connection with the removal for replacement or repair of one or more of the plungers. It is to solve this problem of excessive downtime of the feeder that the present invention was directed.

Figure 2:
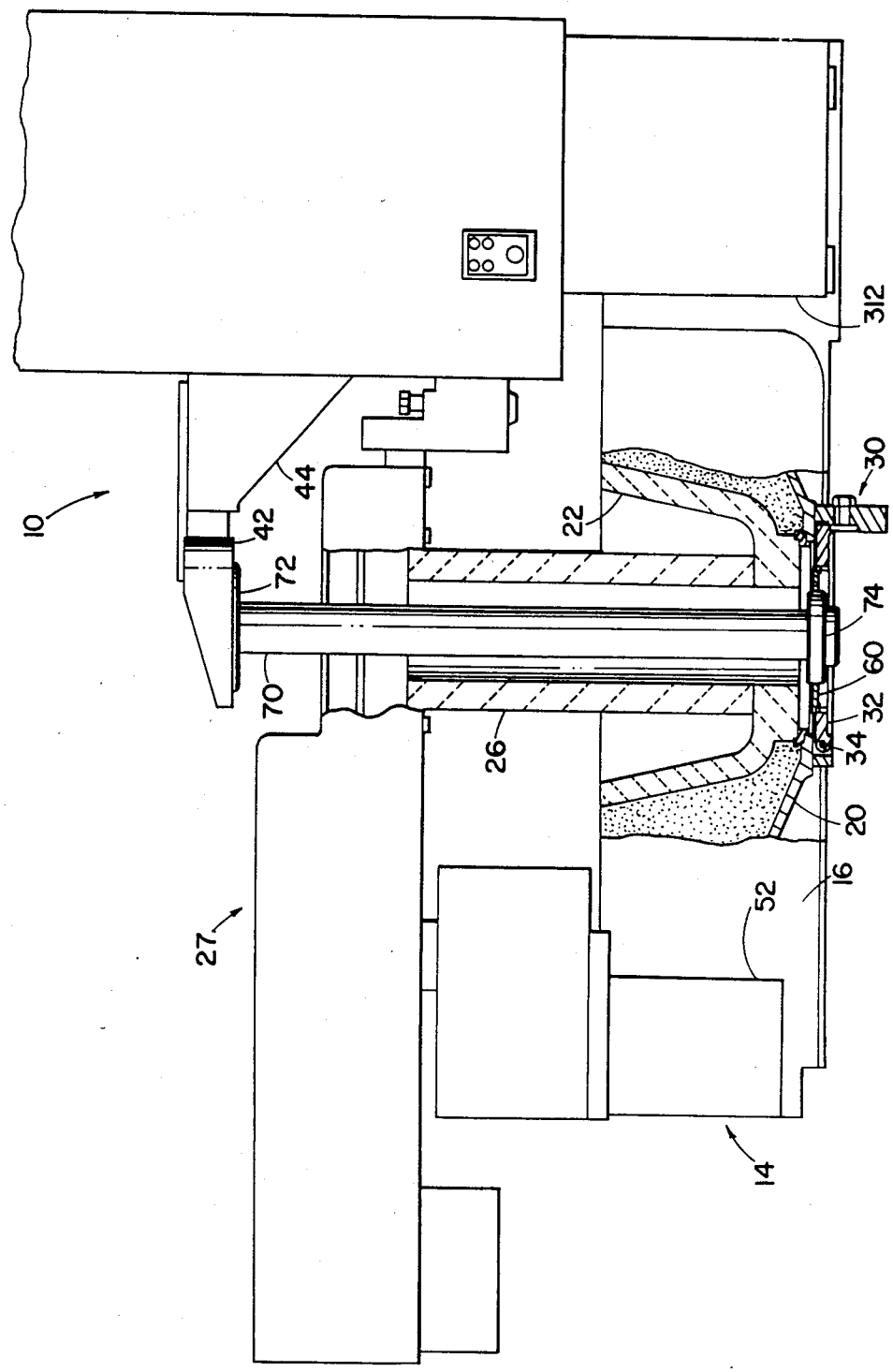
FIG. 2 is a view similar to FIG. 1 but illustrating the plungers removed and replaced by an alignment tool in accordance with the present invention, and illustrating also removal of the orifice plate and replacement thereof with an alignment disk in accordance with the invention.

Turning next to a discussion of the apparatus of FIG. 2, the plungers, plunger chucks, and plunger carrier disk have been removed from the feeder and a elongated alignment tool substituted therefor. This alignment tool is mounted in the plunger holder or banjo frame 42. The orifice plate 18 has been removed and replaced by an alignment disk 60 in FIG. 2. The pivotally mounted support 32 that normally supports this plate 18 is also used for the disk 60.

The elongated alignment tool 70 has a tubular intermediate portion with annular fittings provided at its upper and lower ends as indicated generally at 72 and 74 respectively in FIG. 2. The lower fitting 74 is adapted to fit snugly in an opening provided for this purpose in the alignment disk 60, as best shown in FIGS. 6 and 7. More particularly the alignment disk 60 can be seen from these views (FIGS. 6 and 7) to have locating keys 64 and 66 adapted to be received in locating slots 32a and 32b respectively provided for this purpose in the orifice plate support ring structure 32. The alignment disk 60 defines a central opening 62 adapted to receive the flanged lower end portion of the alignment tube 70 as best shown in FIG. 6. The plunger mechanism is utilized to adjust the alignment tool in the X and Y direction so that the flanged lower end of the alignment tool is centered in the opening 62 and then lowered. The alignment disk opening defines a half hole 68 that is adapted to be aligned with a half hole 75 provided in the outer periphery of the flanged lower end portion 74 of the alignment tool 70. These half holes provide convenient indexing means with a pin of proper size used in the resulting hole. The half holes are shown aligned at the right hand side of FIG. 6 the half hole in the alignment tool lower end portion 74 being illustrated at 75 in this view. When so aligned these half holes 75 and 68 in the alignment tool and the alignment disk respectively define the whole hole. The indexing means provides a convenient reference from which the elongated tool 70 can be oriented in the feeder bowl to a predetermined angular position. The vertical position of the tube 70 can be varied by jogging the switches associated with incrementally moving the plunger mechanism described in the aforementioned copending patent application. Taking the top surface 32c of the orifice plate support structure as a reference height the alignment tool 70 is preferably inserted so as to project through the opening 62 in the alignment disk 60 to the extent that the lower end 74a of the alignment tool 70 extends below the upper surface 32c of the orifice plate support structure by a known vertical dimension $Z_0$. The alignment tool 70, and more particularly the lower portion 74, is illustrated in phantom lines in FIG. 6 in order to illustrate how the alignment tool itself can be brought downwardly into position within the opening 62 provided for this purpose in alignment disk 60.

Figure 3:
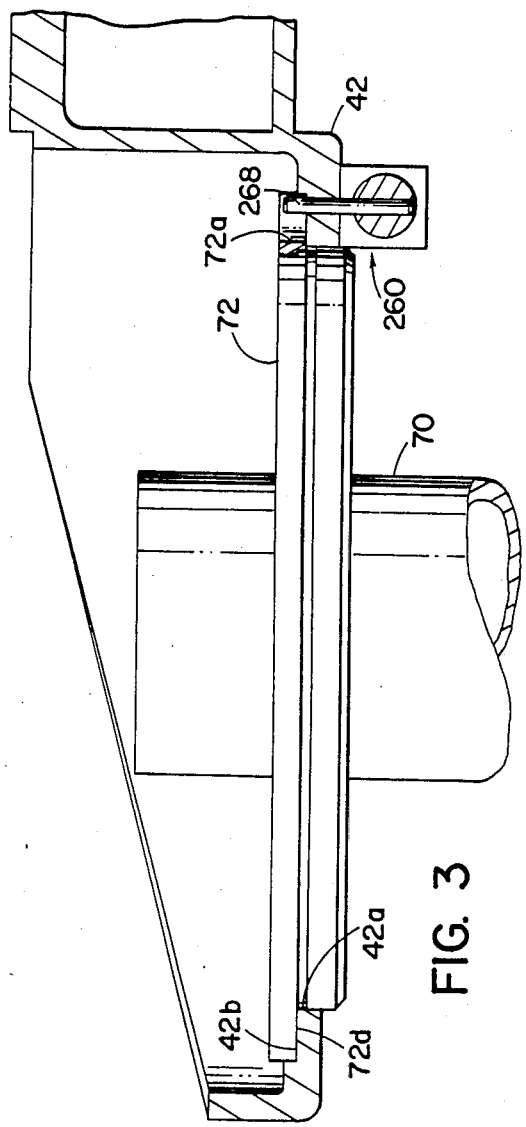
FIG. 3 is an elevational view illustrating in section the upper end portion of the alignment tool as it would appear mounted in the plunger holder.
Figure 4:
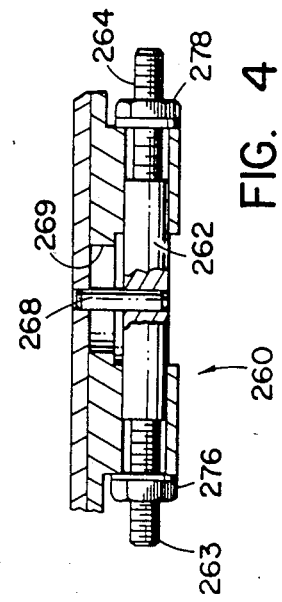
FIG. 4 is an end view of the structure illustrated in FIG. 3 for achieving a limited and controlled rotation of the alignment tool in the plunger holder.

The alignment tool 70 can be located in the X and Y directions (that is horizontally) by utilizing the plunger operating mechanism as described in the above mentioned copending patent application incorporated by reference herein. The alignment tool 70 and more particularly its upper flanged end portion 72 is provided in the plunger holder or banjo frame 42 in much the same manner as the carrier disk 40 for the plungers 12 was supported therein as shown in FIG. 1 and as described in the above mentioned pending patent application. FIG. 3 illustrates the stepped external configuration for the flanged upper end portions 72 of the alignment tool. The radially outwardly opening slot 72a in the outer perhiphery of the larger diameter portion of upper flange 72 is adapted to receive a vertically extending pin 268 shown and described in some detail in the above-identified pending patent application with reference to FIGS. 6, 7 and 8 of the drawings in that application. As described therein the mechanism of FIGS. 3, 4 and 5 herein is described as a "plunger shear angle adjusting mechanism 260". This mechanism 260 comprises a rod 262 with threaded ends 263 and 264 and with a central pin 268 mounted in the rod at right angles to the rod. This pin 268 is received in the slot 72a of the alignment tool 70. A similar slot is provided in the plunger carrier disk 40 so as to achieve fine adjustments in the so-called shear angle as described in the pending application. The shear angle is a term used to refer to the orientation of the vertical plane defined by plungers 12, 12 with reference to a horizontal defined by the X and Y direction. Different shear angles being required for a particular installation in a particular glassware plant.

Figure 5:
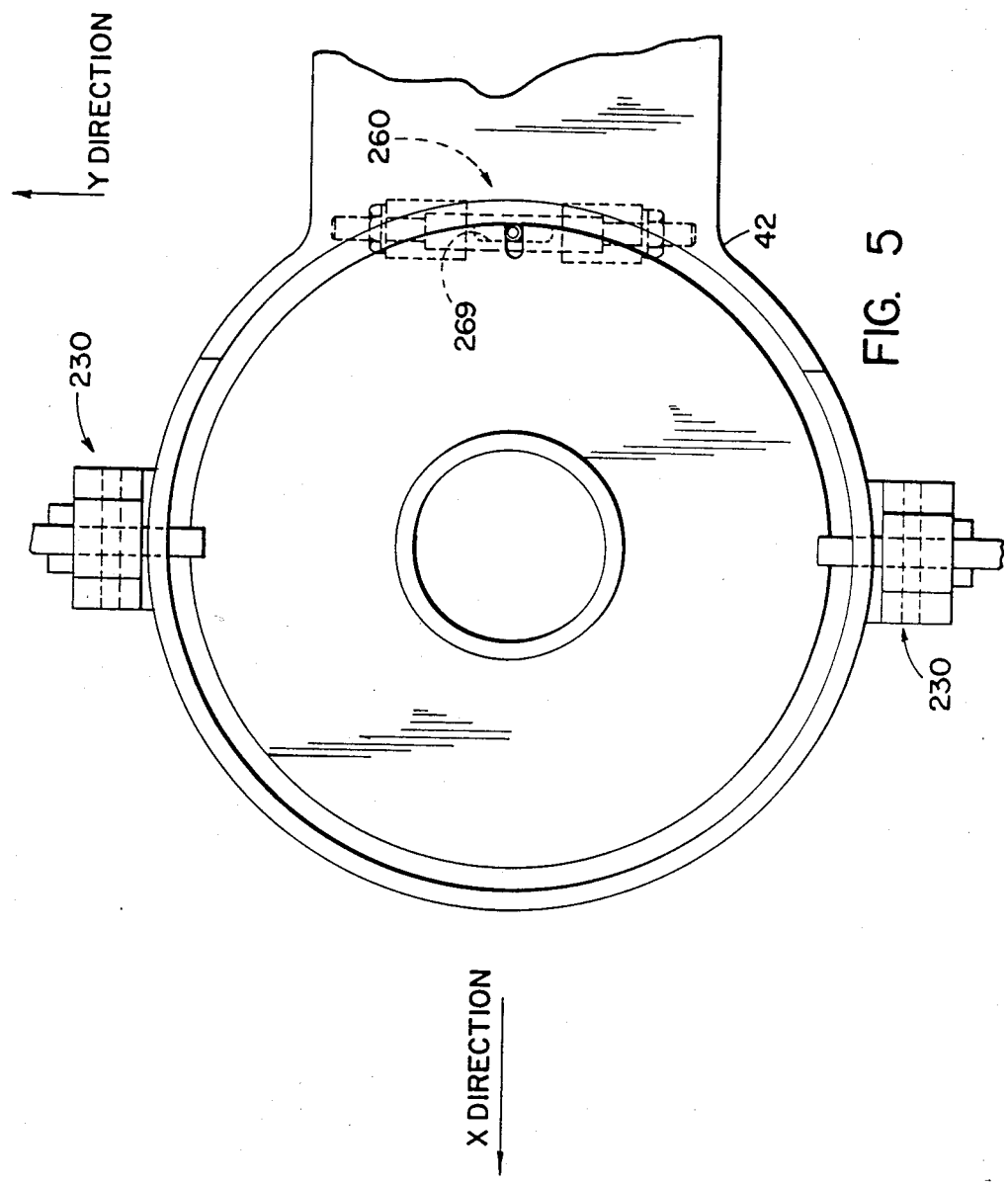
FIG. 5 is a plan view of the plunger holder and alignment tool as illustrated in FIGS. 3 and 4.

Still with reference to the mechanism 260, and referring particularly to FIGS. 3 and 5, pin 268 passes through a slot 269 in the bottom side of banjo frame 42 and into the slot provided for this purpose in carrier disk 40 or a similar slot 72a in the flanged upper end portion 72 of the alignment tool 70. Locking nuts 276 and 278 are provided on the threaded ends 263 and 264 respectively of the rod 262 in order to provide for a convenient manner for anchoring the pin 268 in a particular position. Thus, limited adjustment of the pin location relative to the banjo frame is provided in order to achieve the fine adjustments in "shear angle". The banjo frame or plunger support structure 42 also includes clamping devices (not shown) of the type described in some detail with reference to FIGS. 4 and 5 in the above-identified patent application incorporated by reference herein. These clamping devices serve to clamp either the plunger carrier disk 40 in the banjo frame 42 or to clamp the upper end of alignment tool 70 as suggested in said application in FIG. 5 at 230. These clamping devices will not be described in detail herein, because they are deemed to be adequately described in the above-identified copending patent application.

Figure 16:
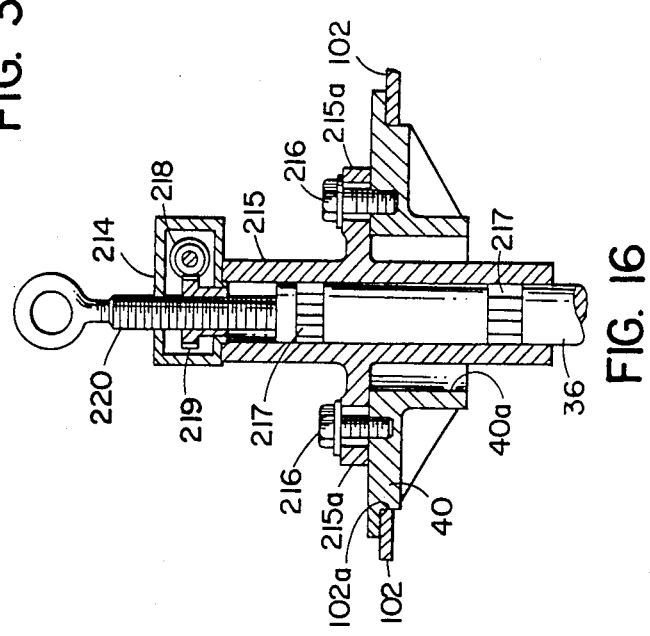
FIG. 16 is a sectional view on line 16—16 of FIG. 15.
Figure 15:
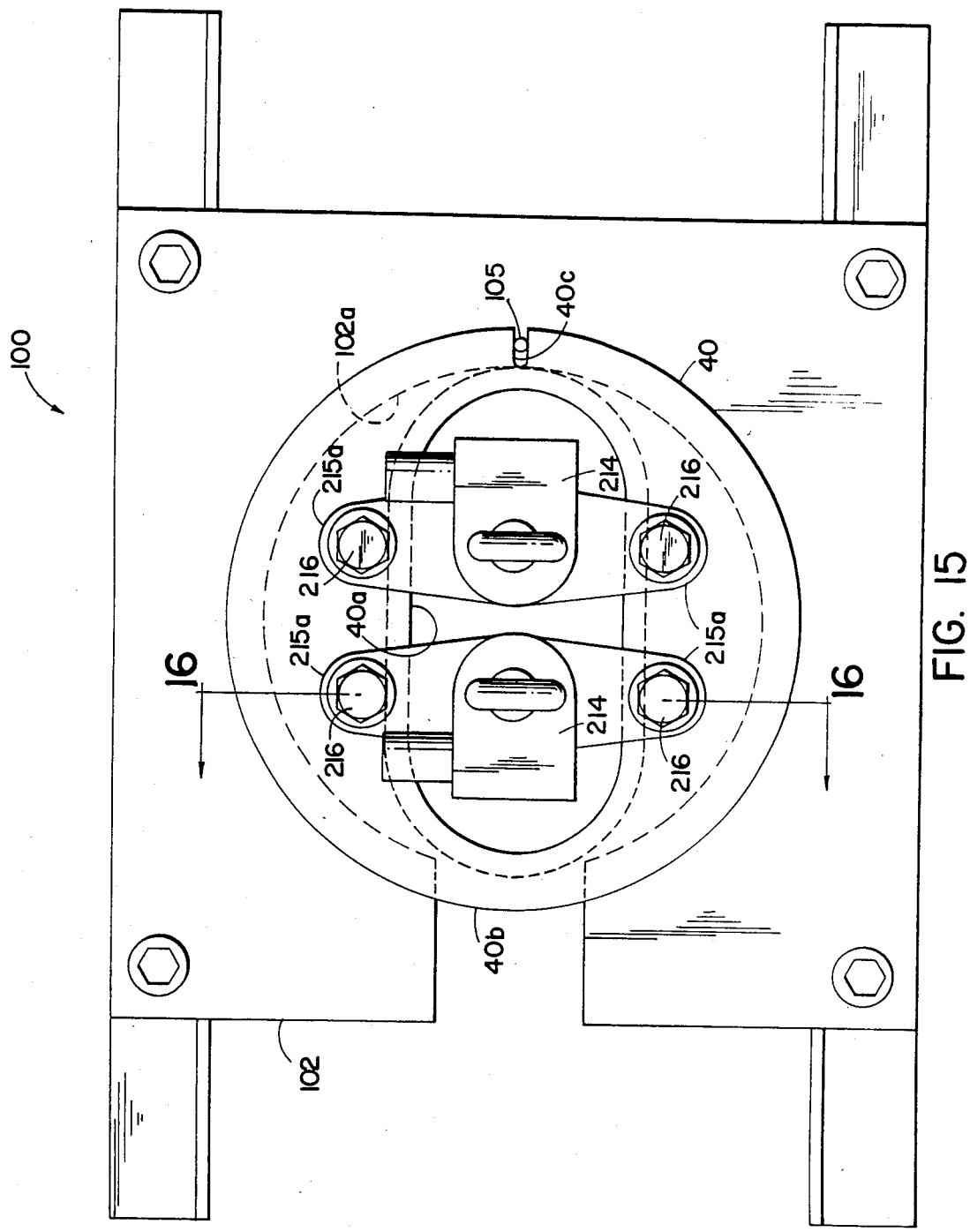
FIG. 15 is a top view of the structure illustrated in FIG. 14.
Figure 17:
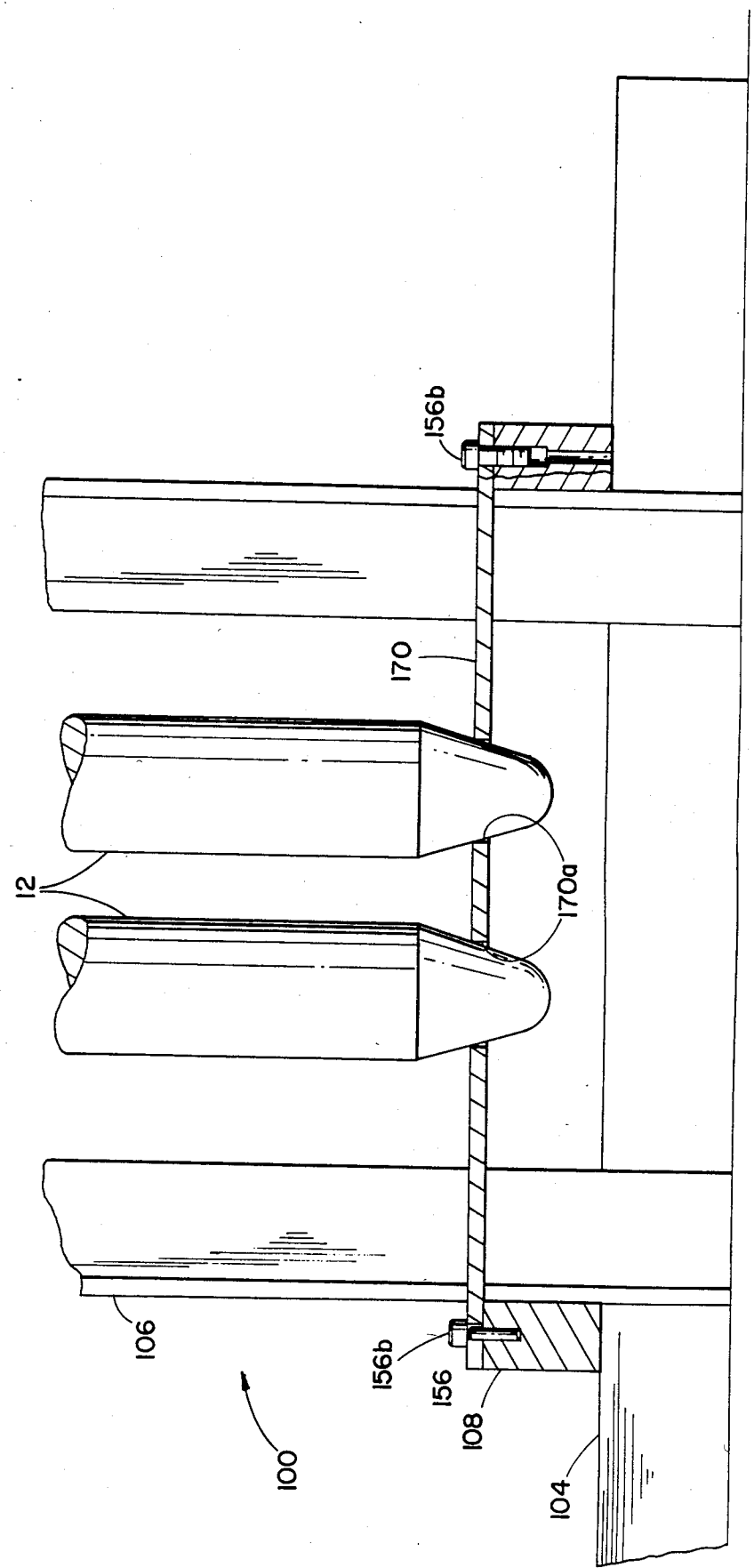
FIG. 17 is a sectional view through the lower portion of the framework and the associated plungers as illustrated in FIGS. 14 and 15.

Prior to describing in detail the remaining elements or components of the apparatus provided for carrying out the present invention a brief summary of the plunger geometry in a typical glass feeder will be provided by way of reference. Referring more particularly to FIG. 1, two side-by-side plungers are there illustrated as oriented at a ninety degree angle with respect to the Y direction (that is the longitudinal direction of the forehearth). Other angular orientations are possible as dictated by the physical space requirements in a particular glass plant. While two plungers are shown in FIG. 1, and are referred to in the drawings herein, it will also be apparent that one, two, three or any number of plungers might be adapted for use in forming glass gobs to feed one or more glassware machines as referred to above. Typically, the plungers are oriented in a line, and if three plungers are provided they are arranged in side-by-side relationship in much the same manner as the two plungers shown in FIG. 1. The plungers are supported in a carrier disk 40 and as shown in FIGS. 15 and 16 this carrier disk 40 has a diametrically oriented slot 40a which is adapted to accommodate several plungers in a line or vertical plane. Still with reference to FIG. 16 each plunger has its chuck portion 36 supported in a plunger support casting 215 and radially outwardly extending portions 215a of the casting have enlarged openings to receive mounting screws 216 that serve to anchor the casting 215 to the upper surface of the plunger carrier disk 40. As a result of these openings each plunger can be oriented in the X and Y direction. The oversize holes being provided for this purpose in the flange portions 215a of the plunger support casting 215. Vertical adjustment of each plunger, and more particularly of the plunger chuck 36, is accomplished by threaded shaft 220 provided at the upper end of the plunger chuck 36. This shaft 220 is keyed to the plunger support casting 215 to prevent its rotation, and a threaded nut 219 is provided rotatably in superstructure 214 carried by the casting 215 so that rotation of worm gear 218 on a flexible drive shaft, all as described with reference to the above mentioned pending patent application, will achieve vertical movement of the threaded shaft and hence also of the plunger chuck 36 so as to achieve a desired vertical position for the plunger.

Thus, the prior art approach provides for the plungers to be individually adjusted in the feeder bowl itself so that the lower ends are provided in a predetermined position relative to the orifices defined in the orifice plate 18. However, this is a time consuming task because each plunger will be slightly different from another. A lower refractory end portion of each plunger is joined to an elongated chuck portion with the result that each plunger may not have its lower end portion located vertically below the center line of its plunger support casting 215. For example, annular tolerance rings 217 are provided on the upper end of the chuck 36 as shown in FIG. 16 in order to accommodate some of these dimensional differences between plunger assemblies at assembly in the associated plunger support casting 215. The purpose of the present invention is to avoid the necessity for manually adjusting each of the several plunger assemblies while they are suspended in the feeder. The alignment tool 70 referred to previously can be utilized to provide a frame of reference between the orifices in the orifice plate (actually the alignment disk subsituted for the orifice plate in the orifice plate support frame) and the plunger holder or banjo frame 42 which supports the plunger carrier disk 40. The plunger carrier disk itself is utilized in a jig framework to be described for setting up the plungers in the manner suggested by FIGS. 14–17 inclusively. As described in the above mentioned pending patent application the plunger carrier disk 40 is adapted to be clamped in the plunger holder or banjo frame 42 when the plungers are mounted in the feeder. As shown in FIGS. 14–17, however, the plunger carrier disk 40 is located in a jig framework 100 solely by a peripheral extending flange 40b resting on the top surface of a plate 102 provided for this purpose in the upper portion of the fixed jig framework 100. Plate 102 has a circular opening 102a for receiving the carrier disk 40. Thus, the carrier disk is located at a particular vertical position relative to the top surface of plate 102 in the framework 100. In order to locate the disk 40 at a particularly orientation in the horizontal plane, plate 102 has a dowel pin 105 provided therein which dowel pin is adapted to be received in the radially outwardly open slot 40c normally provided in the plunger carrier disk 40. This construction allows the plunger carrier disk to be located or oriented in the banjo frame 42 as a result of pin 268 referred to previously with reference to FIG. 3.

It will be apparent then that one or more plunger assemblies can be conveniently provided in the jig framework 100 so as to occupy positions which simulate those which the plungers assume in the feeder itself. In order to provide for precise positioning of the plungers relative to one another, so they will be properly positioned relative to the orifices in the orifice plate 18, the present invention contemplates utilizing the plunger alignment tool 70.

Figure 8:
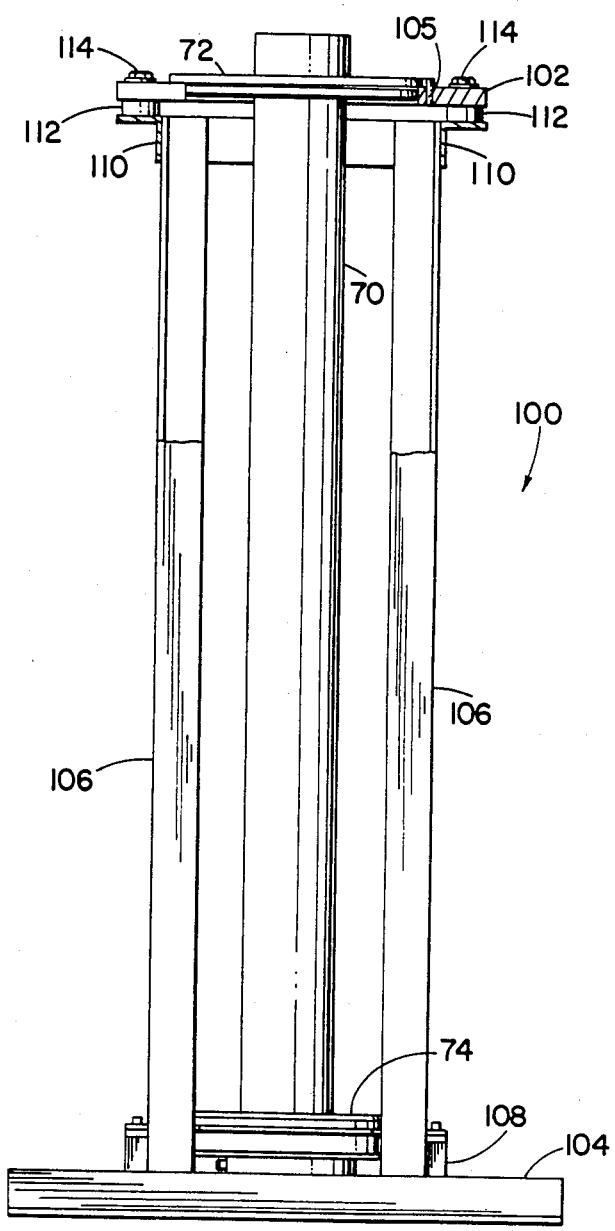
FIG. 8 is a elevational front view of the jig framework in which the alignment tool referred to above is mounted.

The apparatus of the present invention comprises the alignment tool 70 described hereinabove with reference to FIGS. 2, 3 and jig framework 100 adapted to be located remotely from the feeder and adapted to receive the alignment tool 70 as shown in FIG. 8 to set up the jig framework 100, and subsequently to receive the plunger assemblies and the carrier disk 40 provided for supporting these plunger assemblies.

Figure 9:
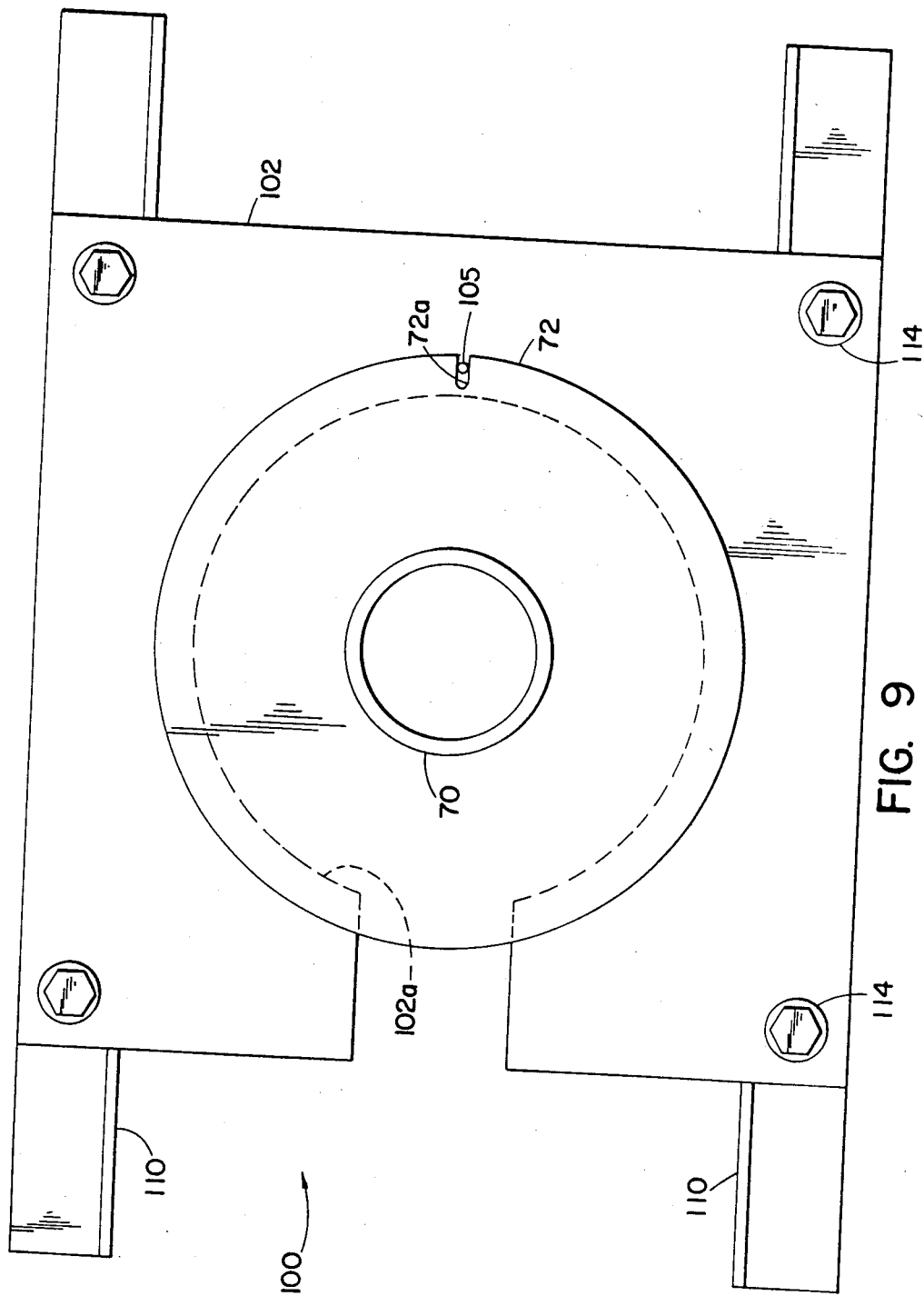
FIG. 9 is a top view of the structure illustrated in FIG. 8.
Figure 10:
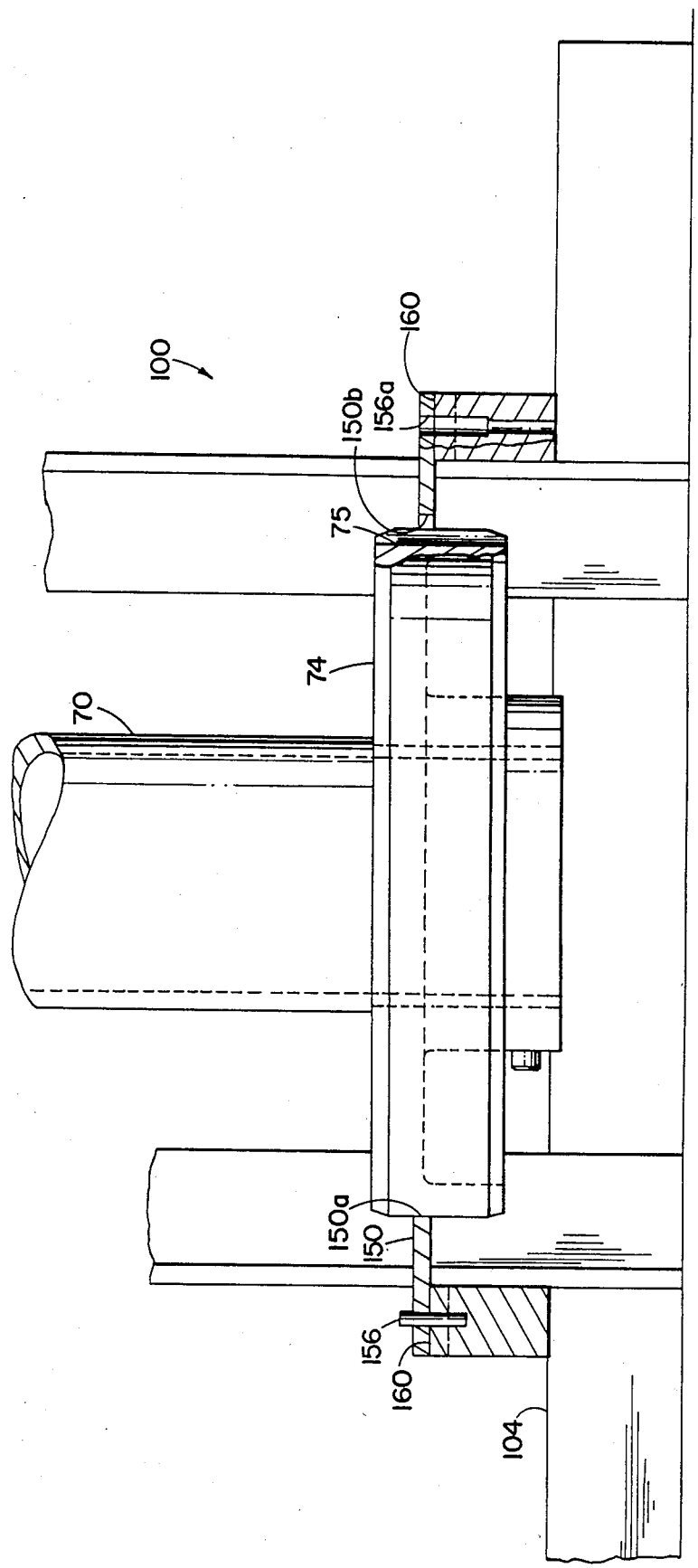
FIG. 10 is a partial vertical sectional view illustrating the lower portion of the alignment tool and jig framework shown in FIGS. 8 and 9.

The alignment tool 70 comprises an elongated intermediate portion of tubular configuration and upper and lower flanged portions 72 and 74. The upper flanged portion 72 is best shown in FIG. 3 where the tool is supported in the plunger holder or banjo frame 42. FIG. 9 shows this upper portion 72 mounted in plate 102 of the jig framework 100. The radially outwardly open slot 72a is shown as adapted to being aligned with locating pin 105 provided for this purpose in the plate 102. FIG. 10 shows the lower portion 74 of alignment tool 70 and corresponds to the view of this lower end portion of the alignment tool as described previously with reference to FIG. 6. In FIG. 10, the alignment tool 70 is provided in the fixed jig framework 100 and more particularly, is suspended therein so that the lower flanged portion 74 fits within a circular opening 150a provided for it in the gage plate 150. Gage plate 150, like alignment disk 60, has a half hole 150b that can be aligned with a half hole 75 in the lower portion 74 of the alignment tool 70. Actually, the tool 70 is located with respect to the locating pin 104 in the jig framework 100. The half hole in the gage plate is then aligned with the half hole in the lower port of the tool.

Figure 11:
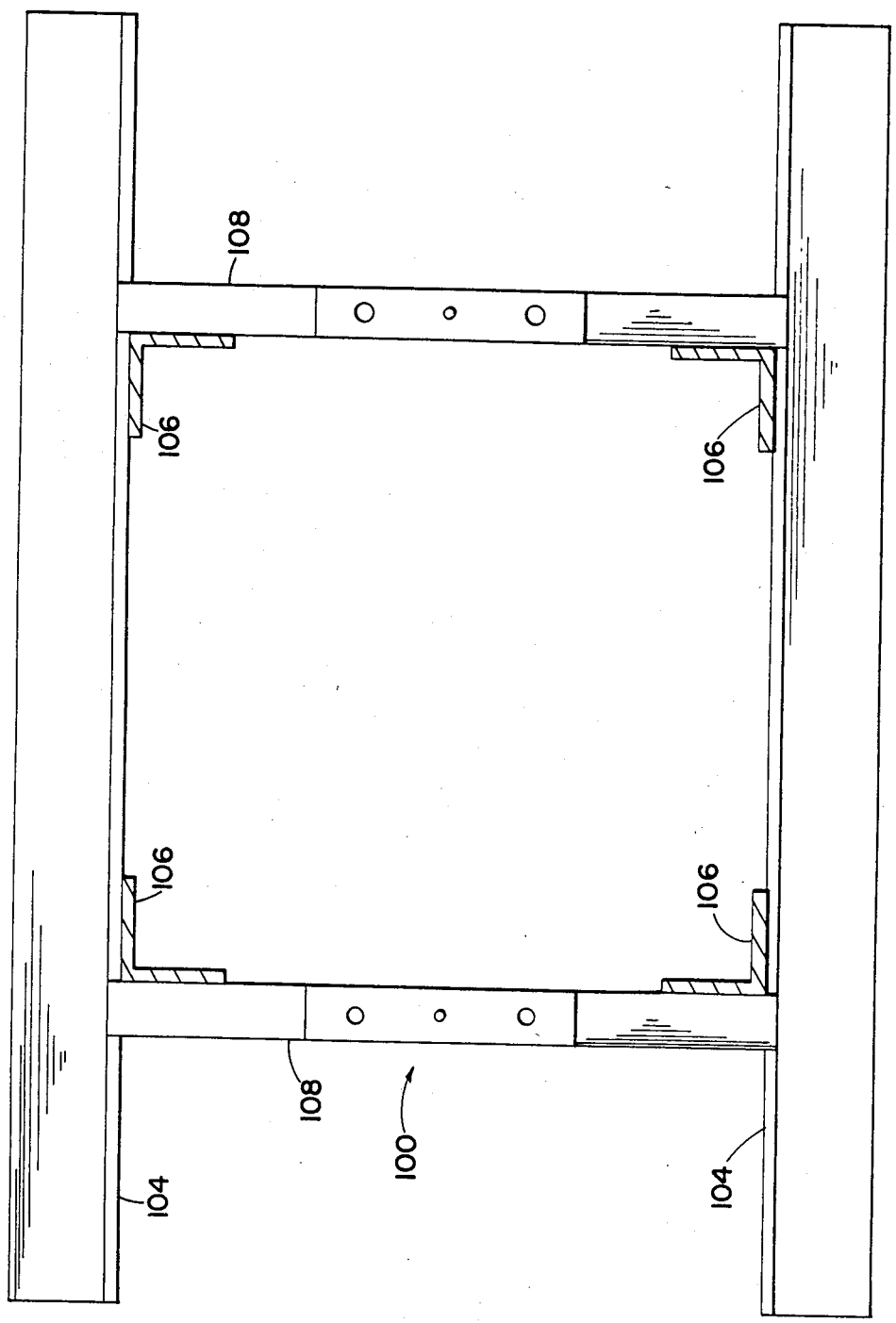
FIG. 11 is a horizontal sectional view through the lower end portion of the jig framework illustrated in FIGS. 8, 9 and 10 with the alignment tool removed and without the gage plate or plunger gage plate as provided in the lower end of the jig framework and as shown in FIGS. 12 and 13 respectively.
Figure 12:
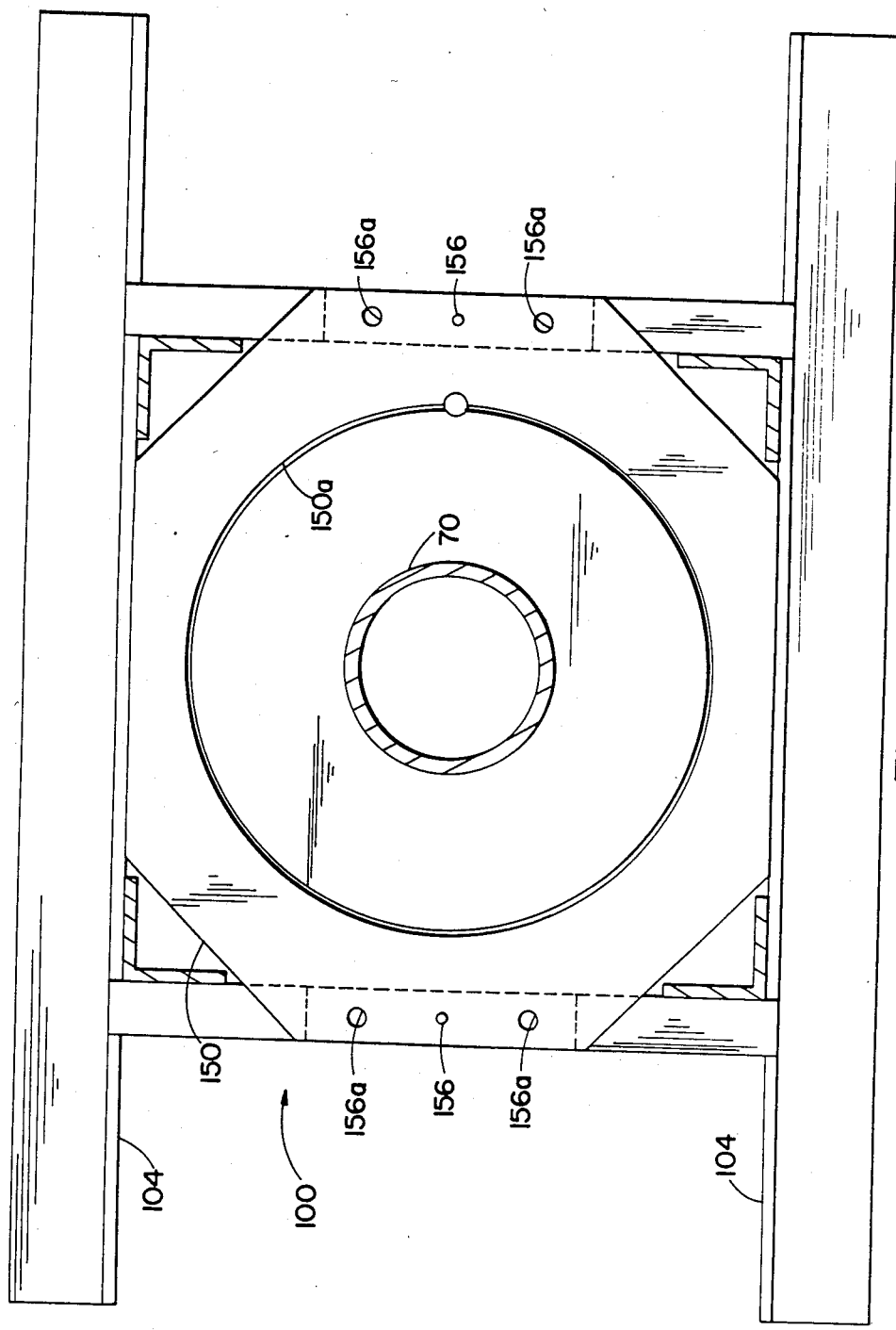
FIG. 12 is a view similar to FIG. 11 but illustrating the gage plate mounted in the lower end of the jig framework.
Figure 13:
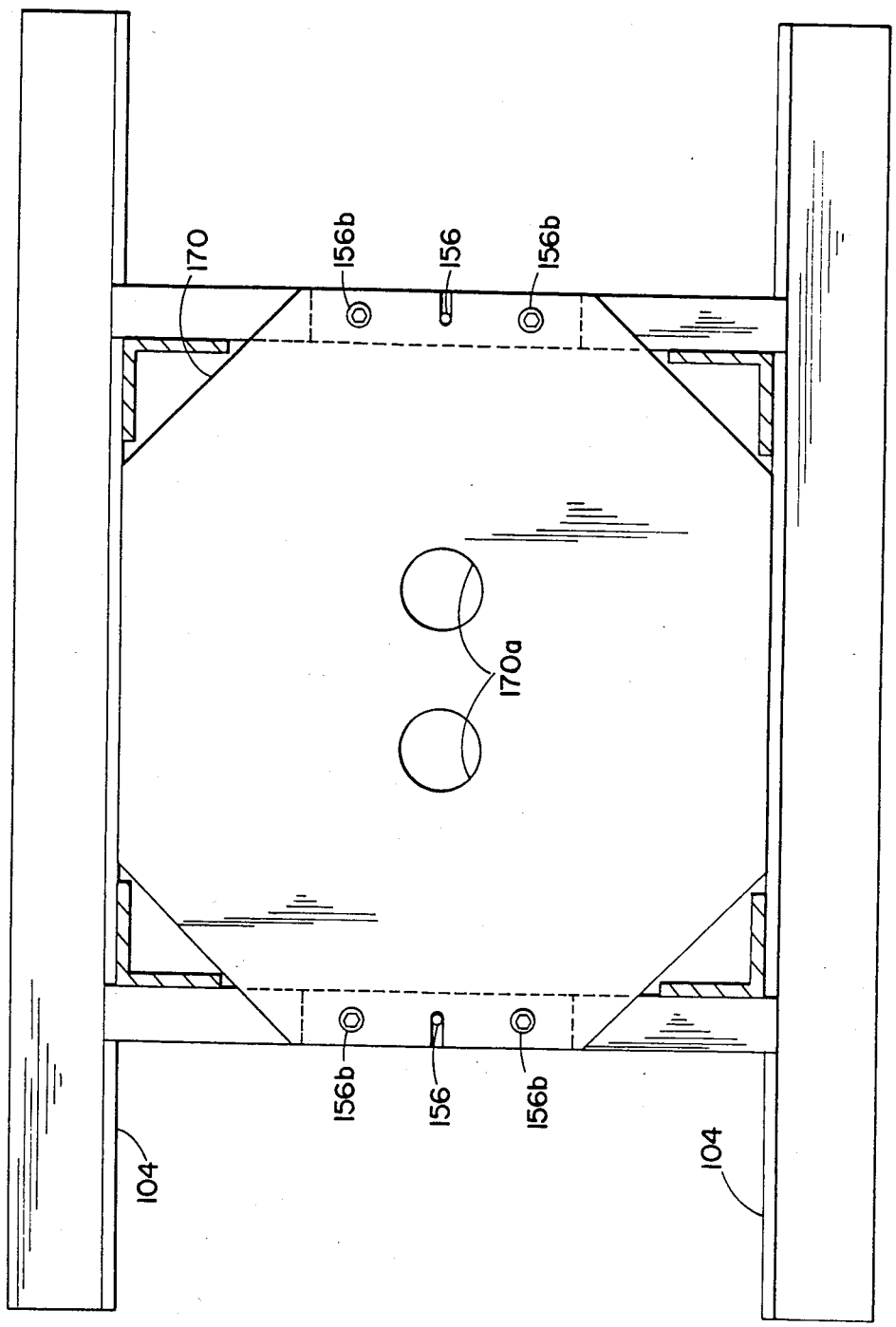
FIG. 13 is a view similar to FIG. 12 but with the gage plate removed and replaced by a plunger gage plate.

In setting up the jig framework 100 for achieving the advantages of the present invention the following procedure is followed. The alignment tool 70 is first placed in the feeder bowl as outlined previously, and this subprocedure assures that the plunger holder 42 is precisely located in a position that when related to the geometery of the alignment tool assures that the alignment tool can be utilized in the jig framework 100 to provide a repeatable reference from which the plungers can be assembled. The jig framework assures that these plungers will be properly oriented in the plunger holder 42, and that the lower ends of the plungers will be properly positioned relative to the orifices and the orifice plate 18. In order to accomplish this result gage plate 150 is located with reference to the lower end of the alignment tool and with reference to the flanged portion 74. Once the plate 150 has been so located pins and/or screws 156, 156 are provided to secure said plate 150 in the lower portion of the jig framework 100. The alignment tool 70 can then be removed and a second plate called a plunger gage plate 170 located in precise relationship to that formerly occupied by the gage plate 150. FIG. 12 illustrates the gage plate 150 in position, and the alignment tool 70 also located in the opening 150a provided for it in the gage plate 150. The pins 156 are installed or assembled only after the alignment tool has been provided in suspended relation in the jig framework 100. Screws are preferably provided in the openings indicated generally at 156a in FIG. 12 and also serve to more conveniently anchor the plunger gage plate 170 to be substituted for the gage plate 150 in FIG. 12. FIG. 13 shows the plunger gage plate 170 anchored in position by the screws 156b and located by the locating pins 156 provided for this purpose. FIG. 11 illustrates the lower portion of the jig framework 100 without the gage plate 150 and without the plunger gage plate 170. As shown in FIG. 13 two plunger tip openings 170a are provided in the plunger gage plate 170 and these plunger tip openings 170a are precisely located on a line that reflects the particular shear angle of the plunger installation to be provided in the feeder. Furthermore, these tip openings are preferably of slightly smaller diameter than the plunger itself and can be utilized to locate the plungers vertically as suggested in FIG. 14.

Figure 14:
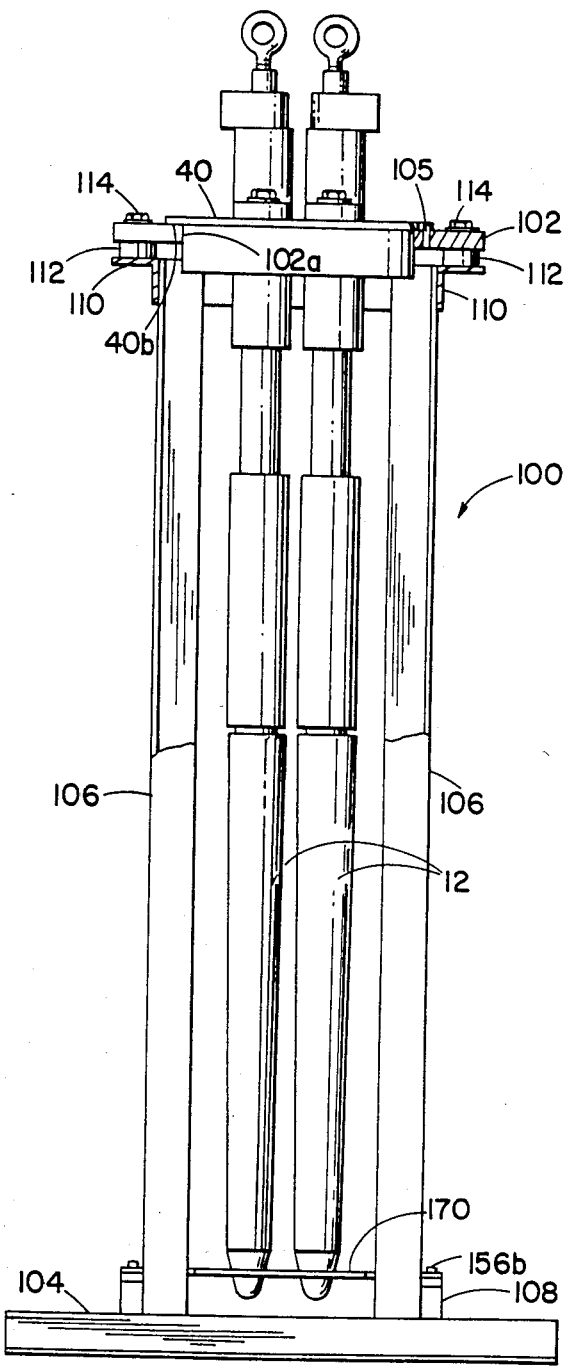
FIG. 14 is an elevational view, with portions broken away to reveal two plungers and associated plunger chucks, and the plunger carrier disk mounted in the jig framework referred to above.

The jig framework 100 is adapted to be provided at a remote location from the feeder, and several such frameworks can be fabricated to set up and/or to store any number of combinations of plungers suitable for use in a particular feeder. The feeder itself need only have one alignment tool to provide a convenient reference for repeatably permitting one to "zero" in the plunger holder 42 with respect to the reference plane of the orifice plate support structure in that particular feeder. The jig framework 100 includes a base portion which is fabricated by welding up a plurality of angle irons in the preferred embodiment. FIG. 11, for example, shows the base as including two horizontally extending members 104, 104 which have welded to them four uprights 106, 106. The flanges of the horizontally extending portions 104, 104 have cross beams 108 attached thereto and to the lower ends of the vertical legs 106. This geometry provides a very rugged support for the framework providing dimensional stability for the resulting jig assure that the apparatus can be used over long period of time without suffering changes in its configuration. The upper portion of the jig framework is illustrated in FIGS. 8 and 14, and includes two cross members 110, 110 welded to the upper ends of the vertical supports 106, 106 to provide a platform for supporting the upper plate 102 referred to previously. Actually, spacers 112, 112 are provided on the screws 114 used to secure the plate 102 in the position shown for it in FIG. 14 and in FIG. 8. The alignment tool or tube 70 is conveniently made of tubular material with upper and lower flanged portions attached thereto by any convenient means. As best shown in FIG. 6 the lower flange 74 may be formed by casting and pinned to, or screwed to, the lower end of the tube as shown. The upper end of the alignment tool comprises a stepped flange 72 which is adapted to seat in the plunger holder 42 and more particularly in such a manner that the flange surface 72d seats on surface 42b as shown in FIG. 3. The circular opening 42a in the plunger holder or banjo frame 42 has a size corresponding to that of the circular opening 102a defined by the upper plate 102 of the jig framework as mentioned previously. It will be apparent from comparing FIG. 3 to FIG. 8 that flange 72 seats in the plate 102 in the same manner as the plate 72 seats in the banjo frame 42.

The alignment disk provided in the orifice plate support structure is constructed and arranged to fit a particular feeder also, and defines a central opening in which the lower end 74 of the alignment tool 70 can be fitted as described above. This alignment disk and the gage plate and plunger gage plate described previously with reference to the jig framework assure that the alignment tool 70 will carry over the applicable dimensions and peculiarities of a particular feeder to the jig framework as fabricated in accordance with the method decribed above. The plunger holder is used to lower the tool vertically so that the lower end of the alignment tool is centered in the opening provided for it in the alignment disk. By ajustably rotating the alignment tool in the plunger holder the lower end of the tool is oriented in the desired relationship with the orifice plate support structure and alignment disk. The tool 70 can be removed from the plunger holder and provided in the jig framework at a location remote from the feeder where the alignment tool is supported from its upper end so that the lower end can be used to locate and secure the gage plate as described above. Once the gage plate has been so located in the lower portion of the jig framework the plunger gage plate is substituted therefor and assembly of one or more plungers can be accomplished. As so constructed and assembled the plunger assembly is available for use in the feeder bowl with a minimum of downtime to the feeder as a result of the virtual absence of any detailed adjustments being required.

We claim:

1. A method for aligning and orienting a plunger assembly in a molten glass feeder of the type having a vertically reciprocable plunger holder adjustably provided in the fixed framework of the molten glass forehearth, and also having a feeder bowl outlet spout that includes means for removably supporting an orifice plate so that the lower ends of one or more plungers can cooperate with aligned orifices in the orifice plate to form glass gobs from molten glass provided to the feeder bowl from the forehearth, said method comprising:

(a) providing an alignment disk in the orifice plate support structure so that the disk is located in a predetermined orientation relative to the feeder bowl outlet spout, (b) providing an elongated alignment tool in the plunger holder, (c) adjustably rotating the tool in the plunger holder until the lower end of the tool is oriented in a particular relationship to the predetermined orientation of the alignment disk in the orifice plate support structure while substantially simultaneously, (d) adjusting the plunger holder vertically so that the lower end of the alignment tool is not only centered in an opening provided for it in the alignment, but is provided at a predetermined vertical position therein, (e) recording the vertical position of the plunger holder when these steps (b), (c) and (d) have been so accomplished, (f) removing the tool from the plunger holder and removing the disk from the orifice plate support structure, (g) providing a jig framework remote from the feeder for supporting the tool from its upper end so that the tool is suspended in a position similar to that of the tool in the plunger holder as recited in step (b) above, (h) providing a gage plate in the jig framework so that an opening in the gage plate receives the lower end of the alignment tool when so provided in the jig framework, (i) rotating the gage plate in the jig framework so that an indexing device provided in the jig framework orients the gage plate in a position corresponding to that of the tool in the plunger holder as oriented pursuant to step (c) above, (j) recording the position of the gage plate in the jig framework as dictated by the tool orienting step (i) above, (k) removing the alignment tool from the jig framework, (l) replacing the gage plate with a plunger gage plate in which plunger openings are provided in accurately indexed relationship to the gage plate opening as recorded in step (j) above, (m) providing a plunger assembly including a disk shaped plunger carrier for the plungers, (n) providing the plunger assembly and carrier disk in the jig framework, and orienting the disk by reference to said indexing means orientation from step (c) above, (o) adjustably positioning the plungers in the carrier disk to locate the plungers by reference to the plunger openings in the plunger gage plate, and (p) securing the plungers to the carrier disk so that the entire plunger carrier assembly including disk can be conveniently provided in the plunger holder of the feeder with minimum downtime to the feeder.

2. A method for aligning and orienting a plunger assembly in a molten glass feeder of the type having a vertically reciprocable plunger holder adjustably provided in the fixed framework of the molten glass forehearth, and also having a feeder bowl outlet spout that includes means for removably supporting an orifice plate so that the lower ends of one or more plungers can cooperate with aligned orifices in the orifice plate to form glass gobs from molten glass provided to the feeder bowl from the forehearth, said method comprising:

(a) providing an alignment disk in the orifice plate support structure so that the disk is located in a predetermined orientation relative to the feeder bowl outlet spout, (b) providing an elongated alignment tool in the plunger holder, (c) adjustably rotating the tool in the plunger holder until the lower end of the tool is oriented in a particular relationship to the predetermined orientation of the alignment disk in the orifice plate support structure, (d) adjusting the plunger holder vertically so that the lower end of the alignment tool is centered in an opening provided for it in the alignment disk, (e) recording the vertical position of the plunger holder as well as the angular orientation of the alignment tool when the steps (d) and (c) have been so accomplished, respectively, (f) removing the tool from the plunger holder and removing the disk from the orifice plate support structure, (g) providing a jig framework remote from the feeder such that vertically spaced lower and upper portions thereof are adapted to simulate the alignment disk in the orifice plate and the plunger holder respectively, (h) providing a plunger assembly, including a disk shaped plunger carrier for the plungers, in the upper portion of jig framework, and (i) adjustably positioning the plungers in the carrier disk to locate the plungers by reference to plunger openings in the lower portion of the jig framework.

3. Apparatus for setting up and/or storing a plunger assembly of the type utilized in a molten glass feeder to form gobs of glass at the outlet spout of a forehearth furnace, said apparatus comprising:

plunger carrier means adapted for mounting in the holder of the feeder said carrier means including plunger supports which provide for individual adjustments to the plunger positions in said carrier means, a jig framework including a base defining a lower support surface, and a plunger gage plate on said support surface, said plate defining a pattern plunger openings for locating the lower ends of the plungers, said jig framework also including an upper support surface spaced from said lower surface by a predetermined vertical dimension, indexing means in said upper support surface and located in a predetermined orientation to said plunger opening pattern, said plunger carrier means including a carrier disk with means for mating with said indexing means of said upper support surface in said jig framework.

4. The apparatus according to claim 3 further characterized by feeder plunger operating mechanism at the outlet spout of the forehearth, said mechanism including a plunger holder and means for moving said holder toward and away from the outlet spout, and plungers mounted in said carrier disk mounted in said holder and oriented therein by indexing means provided in part on said carrier disk and in part on said holder.

* * * * *